Figure 1:
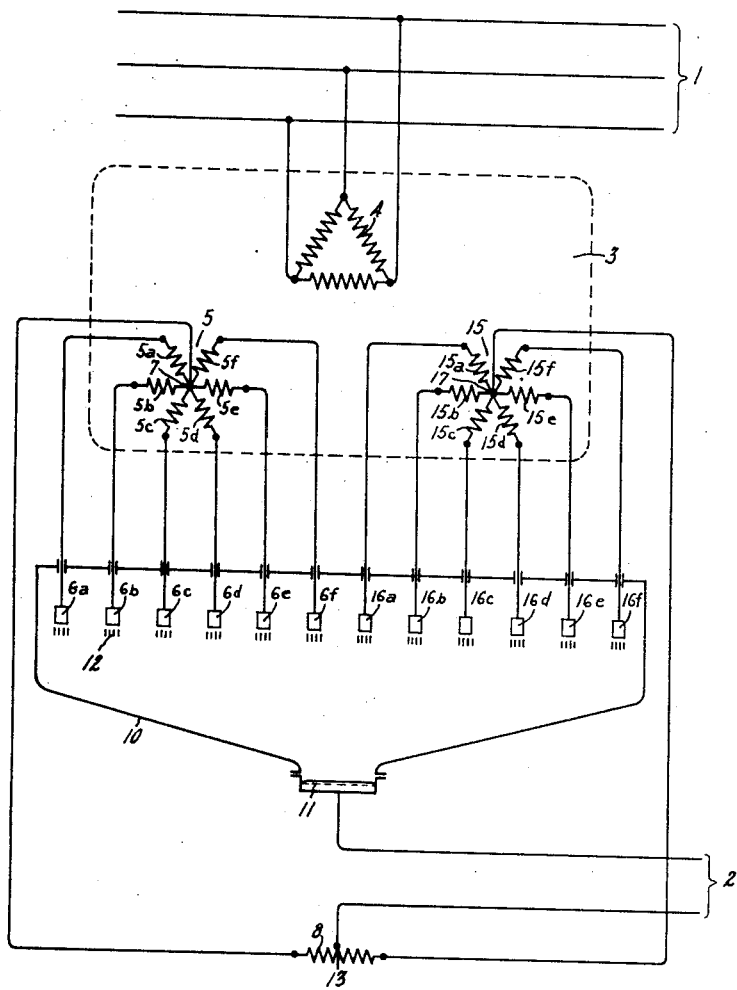

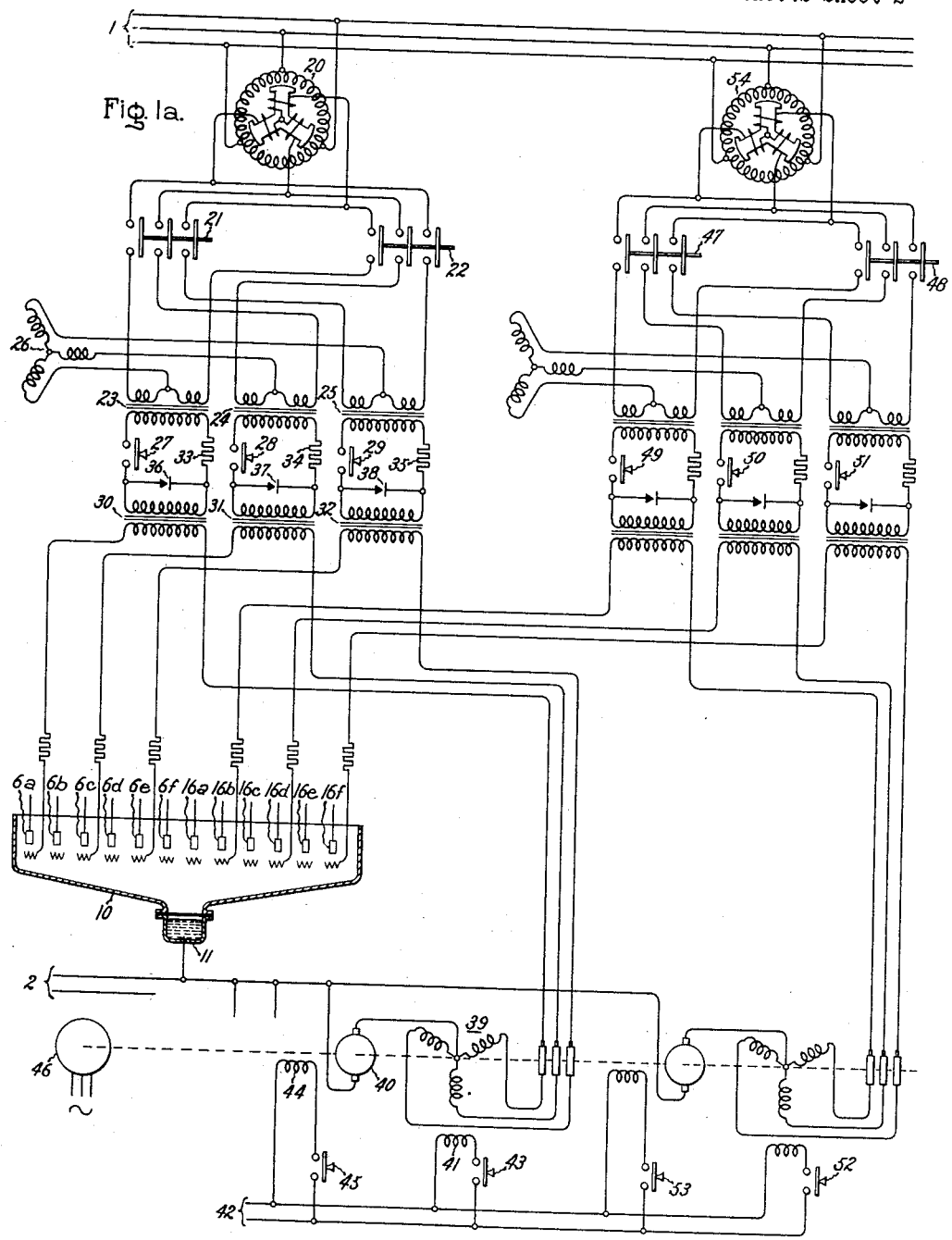

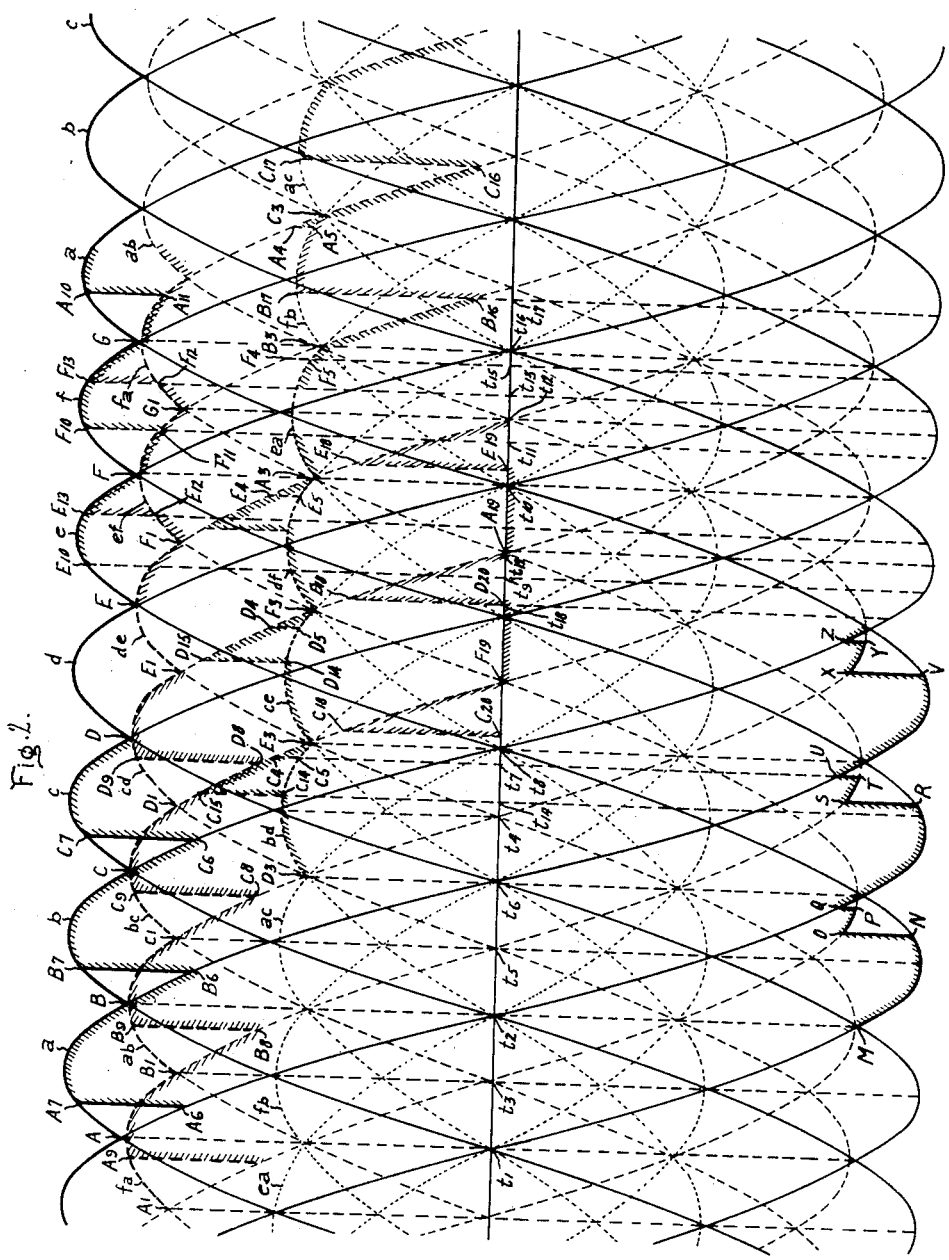

Aug. 10, 1937.    J. AUGIER    2,089,872
ELECTRIC VALVE CONVERTING APPARATUS
Filed June 28, 1935    9 Sheets-Sheet 4

Inventor:
Jean Augier:
by Harry E. Dunham
His Attorney.

Aug. 10, 1937. J. AUGIER 2,089,872
ELECTRIC VALVE CONVERTING APPARATUS
Filed June 28, 1935 9 Sheets-Sheet 7

Inventor:
Jean Augier,
by Harry E. Dunham
His Attorney.

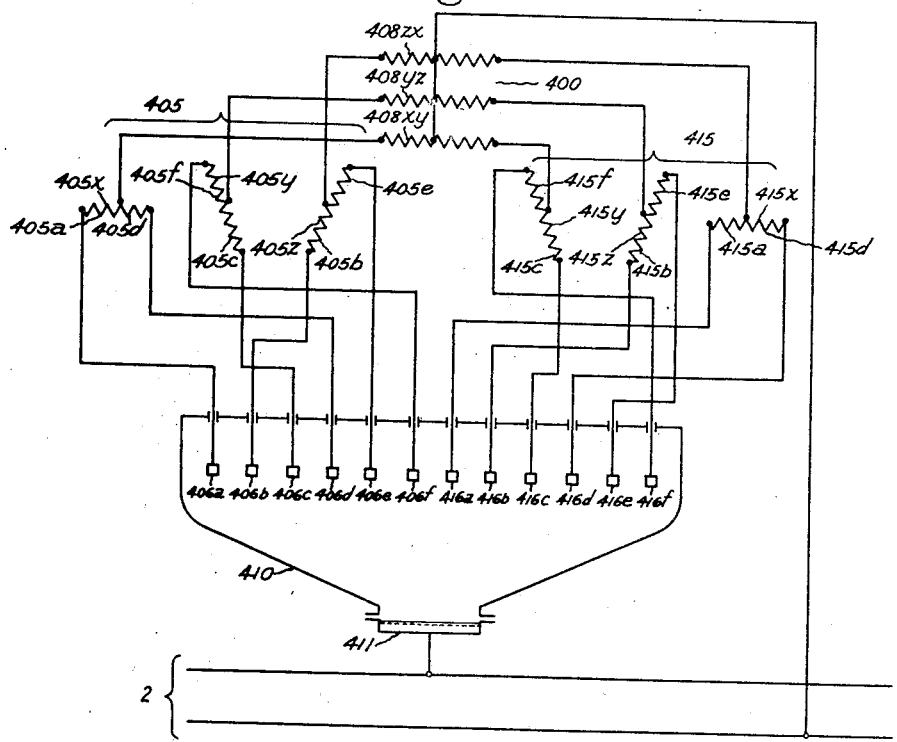

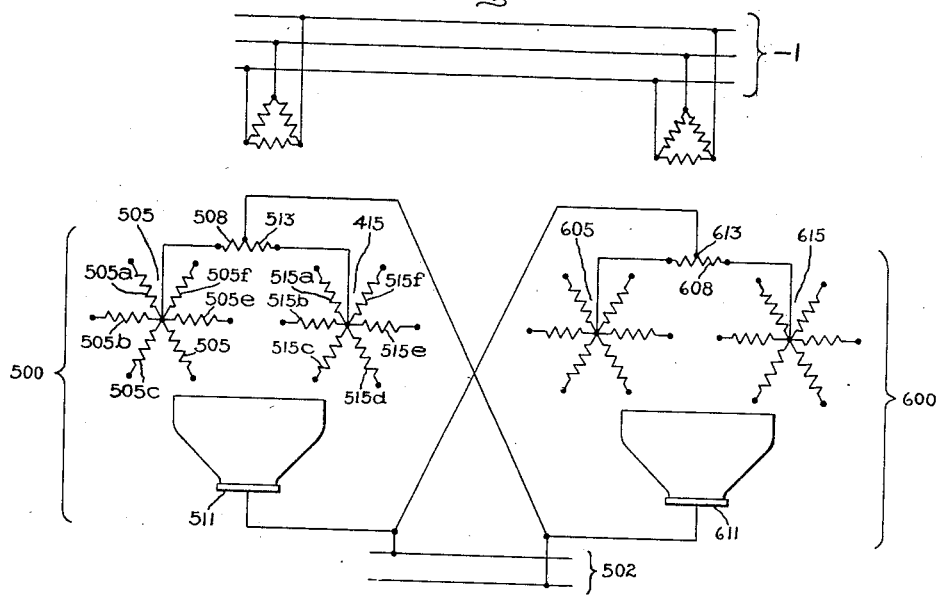
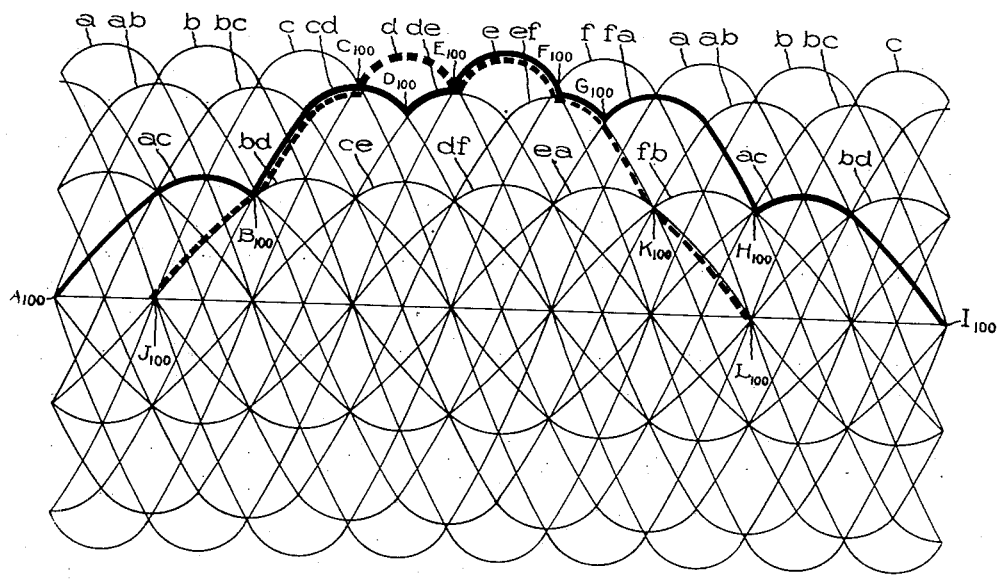

Patented Aug. 10, 1937

2,089,872

UNITED STATES PATENT OFFICE 2,089,872

ELECTRIC VALVE CONVERTING APPARATUS

Jean Augier, Belfort, France, assignor to General Electric Company, a corporation of New York Application June 28, 1935, Serial No. 28,961
In France July 4, 1934

5 Claims. (Cl. 175—363)

My invention relates to electric valve converting apparatus and more particularly to a method of operation of such converters over a wide range of output.

It is known that one can regulate the direction and the magnitude of the voltage of electric converters involving a discharge in ionized gases or vapors by controlling the instant of ignition of the various anodes of the rectifier, said instant being capable of a variation which can be obtained by utilizing either the well-known properties of the control grids or by starting the cathode spot at the proper moments, or by any other means.

Up to the present time, it has been customary to retard by the same electric angle, the ignition of all the different anodes with respect to the moment of the cycle at which the anodes would naturally start. It is known that if this time lag is kept constant, the direction and the magnitude of the continuous potential at the terminals of the converter depends on the value of that time lag. The converter can then permit an exchange of energy between a direct-current network and an alternating-current network. If, however, the time lag in the anode ignition is periodically variable, the converter will furnish an undulating (rippled) voltage, and that property makes it possible to interconnect two alternating-current networks having different frequencies.

The converters which have been built according to these well-known arrangements operate reliably and accurately, but they have, nevertheless, some shortcomings.

On the one hand, the apparent or reactive power on the a-c side of the converter, in the case of a rectifier or inverter, does not depend upon the real power utilized, but solely on the current density on the d-c side. The result is that the power factor is nearly proportional to the ratio between the continuous voltage obtaining in service and the maximum voltage. If the continuous voltage is to be regulated within rather wide limits, the power factor is considerably lowered when one departs from that maximum value, and the consumption of reactive energy becomes enormous. Similar phenomena manifest themselves in the case of apparatus which operate as frequency changers or modulating converters.

On the other hand, the amplitude of the harmonics of the rectified voltage increases very rapidly with the regulating range, and for that reason, the filters which are frequently necessary become often very expensive.

These two disadvantages have greatly handicapped the development of electric converting apparatus involving a discharge in ionized gases or vapors, and particularly the development of mercury-vapor converters.

These disadvantages could be reduced to a certain degree by adopting a method of step-by-step, or rather stage-by-stage regulation, with the stages more or less far apart, in which the transformation ratio of the transformer connected to the anodes of the converter would be varied, and by completing the regulation by influencing, within the intervals between the stages, the moment of ignition of the anodes. This method has the disadvantage that it introduces the complication of necessitating a variable-ratio transformer.

It is an object of the present invention to provide a new method of operation of electric valve converters which permits improving, to a much higher degree, the power factor and the shape of the voltages and currents in converters and other electrical apparatus involving a discharge in ionized gases and vapors, without necessitating the application of variable ratio transformers.

This new method is mainly characterized by the fact that while the various members which constitute the converter or similar apparatus are so arranged that several anodes can be made to deliver current simultaneously, and while several possible relations exist between the phases of the alternating anode potential which can furnish current simultaneously, one brings about, depending upon the regulation to be established, the operation of the converter or other apparatus according to one or the other of these phase relations, and change-over at appropriate moments from the operation according to one of these phase relations to the operation according to another of these relations, said change-over being attainable through any appropriate means, but preferably, according to the invention, by a suitable control of the starting of the anodes (control electrodes, starting the cathode spot at the suitable instants, etc.).

It is known that when several anodes of the same or of several converters or of other apparatus involving a discharge in ionized gases or vapors are coupled to each other by means of intermediate absorption coils, inter-phase transformers, current dividers, etc., the continuous potential at the terminals of the system is at any instant the same as if all the anodes thus coupled which supply power simultaneously were fed by one source the instantaneous voltage of which would be equal to the arithmetic mean of the values of the voltages applied to said anodes, whether these voltages are in phase or not. If one modifies the relation existing between the phases from the voltage sources supplying the anodes which have a simultaneous output, the operation is similar to that which would occur if one were to modify the value of a common fictitious voltage source which would supply in parallel all the anodes which have a simultaneous output. The various phase relations will, therefore, make it possible to establish different respective regulating stages in conformity with the invention.

Any rectifying, inverting, modulating, or frequency-changing apparatus, etc. to which this regulating method is applied will be able to operate with a theoretical phase displacement factor which is equal to unity, (the reactive losses due to the transformers being disregarded), for certain values of the rectified, inverted, modulated or frequency-changed voltage, etc., which values correspond to those phase relations for which the conditions necessary to the commutation between anodes are established at the suitable instants.

In order that the commutation between anodes be possible, the potential of the anode that must start with respect to the cathode must be at least equal to the anode-cathode potential of that anode that is to be extinguished.

For certain phase relations between the anodes that operate simultaneously, these conditions of commutation may be accomplished at the moments where the resultant voltage curves that intersect each other are defined by the phase relations under consideration and that correspond respectively to the anodes which deliver power before and after the commutations between anodes. The theoretical phase displacement factor will be then equal to unity, if one permits the commutation between anodes at the instant which has been just considered, and the value of the voltage of the converter or any other apparatus will be proportional to the geometrical sum of the vectors of the voltages applied to the anodes that function simultaneously.

In the case of other phase relations of the voltages applied to the anodes that function simultaneously, it may occur that the commutation between anodes is only possible after the instant as defined above. In the case of such phase relations, the theoretical phase displacement factor will be less than unity. It will, however, exceed that which would be obtained by simply retarding in the well-known manner the instant of starting the anodes by the value of the electric angle that is necessary to obtain the same value of the converter voltage or other apparatus under consideration.

In the preceding explanations we have assumed that the anodes that were functioning simultaneously were connected in parallel. However, the invention obviously may be applied to series and series-parallel connections.

In the case where the anodes that operate simultaneously are connected in series, the voltage at the terminals of the converter or other apparatus is at each instant equal to (disregarding the voltage drops) the arithmetical sum of the voltages applied to the diverse anodes. As in the preceding cases, there will exist a certain number of possible relations between the phases of the voltages applied to the anodes operating simultaneously, for which relations, the commutation conditions being established at the suitable instants, the theoretical phase displacement factor will be equal to unity, the voltages attained (disregarding the voltage drops) being proportional to the geometrical sum of the voltage vectors corresponding to each phase relation under consideration.

In the case of all the voltages from the converter or from any other apparatus which are created by obtaining, through suitable phase relations between the voltage sources feeding the anodes that operate simultaneously, a phase displacement factor equal to unity, it is quite evident that the undulation or ripple factor is the same as in the case of the maximum voltage and consequently, is much lower than if the regulation had been brought about simply according to the well-known method of retarding the ignition of all the anodes. Thus, by virtue of the method according to the invention, the shape of the voltages and currents of the apparatus to which this method is applied is improved.

Inasmuch as the number of phase relations which can be obtained is limited, the regulation which is realized directly in this manner will be a regulation by stages. To obtain a progressive, gradual regulation and to realize intermediate values between these stages or levels, one can utilize any suitable means of regulation, but particularly—and these special means must be considered as constituting in themselves a part of the invention—one may utilize the method which consists in varying the moment of igniting the anodes, or the method consisting in causing to alternate, according to a suitable cadence, operating stages corresponding to several different phase relations between the voltage sources that supply the anodes which deliver energy simultaneously.

It is quite obvious that the use of the first one of these special methods of intermediate regulation will have the effect of reducing between the various levels the value of the theoretical phase displacement factor. But, since this regulation will take place only between two rather close values of the voltage of the converter or other apparatus, for which the theoretical phase displacement factor is equal to unity or approaches that value, one will obtain, even for intermediate values, an improvement of that phase displacement factor. In fact, the latter is equal to the ratio between the operating voltage or intermediate voltage and the maximum voltage. This maximum voltage is here only the highest voltage which was obtained by the coupling of the anodes of the level under consideration, or which would be obtained by assuming that the commutation of the anodes functioning in succession is possible at the moments which would correspond to unity for the theoretical phase displacement factor. Even better results can be attained by using the second of the special means cited, that is to say by causing to alternate at a suitable cadence, whenever possible, the operating condition of the converter or other apparatus according to various phase relations between the sources supplying the anodes that function simultaneously. In general, in order to get a given operating voltage between two voltages which would prevail, respectively, with two different phase relations, it will be interesting to cause the alternate functioning of the converter or other apparatus according to one or the other of these phase relations.

It will be also advantageous, in order to improve the undulation or ripple factor of the voltage, to have the operation alternate according to the various phase relations, generally two, at a cadence which is as rapid as possible, that is, practically at the frequency of the commutation between anodes.

Finally, one may note that for certain intermediate regulations, one can obtain a theoretical phase displacement factor equal to unity, by suitably selecting a half-wave frequency for the operating state from the limit phase relations, in general by selecting a frequency which is lower than that required by the lowest undulation ratio. This frequency may be selected according to the requirements.

At any rate, it will be advantageous to see to it—and that can be easily done—that the mean load on the various anodes will remain the same for all the operating voltages.

The novel features which I believe to be characteristic of my invention are set forth with particularity in the appended claims. The invention, itself, however, both as to its organization and method of operation, together with further objects and advantages thereof, may be best understood by reference to the following description taken in connection with the accompanying drawings in which Figures 1, 1a, 4, 5, 8, 9, and 10 disclose diagrammatically circuit arrangements to which my invention is applicable while Figures 2, 3, 6, 7, and 11 are graphic representations for explanatory purposes.

Referring to Fig. 1, which represents a physical embodiment of the invention applied to a twelve-anode mercury-vapor converter, the alternating current network 1 and the direct-current network 2 are interconnected by means of a transformer 3 provided with a primary winding 4 connected to the network 1 and with two identical six-phase secondary windings 5 and 15 comprising, respectively, six phase windings 5a—5b—5c—5d—5e—5f— and 15a—15b—15c—15d—15e—15f enumerated in the order of the direction of rotation of the phases. These windings are respectively connected to the anodes 6a—6b—6c—6d—6e—6f, 16a—16b—16c—16d—16e—16f of a mercury-vapor rectifier 10 provided with a cathode 11 and with control electrodes or grids, such as 12. The control circuits for the grids or electrodes which are not shown may be any of the known arrangements as will be apparent to those skilled in the art. The operation of the control circuits of these grids, depending upon the rules which will be set forth later on and conforming with the invention, may be accomplished according to any appropriate means. The neutral points 7 and 17 of the two secondary windings 5 and 15 are interconnected by means of an absorption coil or interphase coil 8, the center point 13 of which is connected to one side of the line 2, the other side of the line 2 being connected to cathode 11. The converter comprising the transformer 3 and the rectifier 10 is resolved, according to the invention, into two elementary groups that operate simultaneously, one of which comprises the secondary winding 5 and the anodes 6a, 6b, 6c, 6d, 6e, 6f, while the other comprises the secondary winding 15 and the anodes 16a, 16b, 16c, 16d, 16e, 16f. The diagrams represented in Fig. 2 will facilitate the understanding of the invention.

In Fig. 2 the curves $a$, $b$, $c$, $d$, $e$, $f$ represent, respectively, as a function of the time plotted on the abscissa, the voltage waves that are induced, respectively in the secondary windings (5a, 15a) (5b, 15b) (5c, 15c) (5d, 15d) (5e, 15e) (5f, 15f).

If the control voltages that are applied to the control grids 12 are such that each anode may start and supply energy as soon as its potential becomes equal to or exceeds that of the anodes that supplied energy just previously, the anodes 6a and 16a for instance, which had started at the time $t_1$, will extinguish at the time $t_2$ (assuming the leakage losses in the transformer 3 to be zero), when the anodes 6b and 16b start. The diagram of the rectified voltage is represented by the upper rippled curve ABCDEFG. The rectified voltage is then a maximum, and the theoretical phase displacement factor is equal to unity. Each anode supplies, for one-sixth of a cycle, a current equal to one-half of the rectified current, since two anodes operate in parallel.

If one prevents, through the action of the control grids, the starting of the anodes 16a, 16c, 16e, on the one hand, and of 6b, 6d, 6f on the other hand, and if the starting of the other anodes is permitted as soon as their potential becomes equal to or exceeds that of the cathode (the inverter operation will give similar results), the operation will be the same as the well-known operation of a six-phase rectifier with an interphase coil. That is to say, the anode 16b starts at the time $t_3$ and becomes extinguished at the time $t_4$ when anode 16d starts in turn, anode 6c starting at the time $t_5$ when anode 6a becomes extinguished. During the simultaneous energy output of two anodes, 6a and 16b for instance, their potential with respect to the center point 13 of interphase coil 8 is, at each instant, equal to the mean of the voltages induced in windings 5a and 15b to which the corresponding anodes are connected, the difference between these two voltages being absorbed in coil 8. The curves $fa$, $ab$, $bc$, $cd$, $de$ and $ef$ represent, respectively, the values of the mean voltage between the voltages induced in the phase windings 5a and 15b (or 15a and 5b), 15b and 5c (or 5b and 15c), 5c and 15d (or 15c and 5d), etc.

The rectified voltage is then represented by the rippled curve $A_1A.B_1BC_1CD_1DE_1EF_1FG_1G$ ... The ratio between the value of the rectified voltage obtained in this manner and the value of the maximum rectified voltage $E_m$ is equal to $$\frac{\sqrt{3}}{2}$$

and the theoretical phase displacement factor is still equal to unity.

The rectified voltage is still shared by two anodes which supply energy simultaneously. The maximum value of the instantaneous anode current has not increased, but on the other hand, only six anodes supply energy, each one during one-third of a cycle, the three others remaining inactive. One can avoid increasing the dimensions of the anodes and of the transformer and one can retain the full utilization of the rectifier by changing over from time to time from the operating anodes to those that are at rest, in other words, after having the anodes 6a—6c—6e—16b—16d—16f, supply current, anodes 6b—6d—6f—16a—16c—16e remaining inactive, one can release the anodes 6b—6d—6f—16a—16c—16e and block the anodes 6a—6c—6e—16b—16d—16f which are inactive in their turn. If these permutations are made (for instance automatically) at equal time intervals that are relatively short with respect to the thermal time constant of the anodes, the mean charge of the anodes is the same as in the case of maximum-voltage operation and the utilization of the rectifier is not decreased.

In the mode of operation which has just been studied, two anodes (to which voltages are applied that are sixty electric degrees out of phase), are allowed to supply energy simultaneously. A new value of the voltage may be obtained by allowing only two anodes to supply energy, to which anodes voltages are applied which are one hundred and twenty electric degrees out of phase. If, for instance, in the time interval between $t_6$ and $t_7$, the anodes $6_b$ and $16_d$ supply energy simultaneously, the other anodes being blocked by their control grids, the potential of these two anodes with respect to point 13 is represented by the curve $bd$, which is the mean of the two voltage curves $b$ and $d$. If at the time $t_7$ which slightly precedes time $t_8$, when the voltage curves $c$ and $d$ intersect each other, the anode $16_c$ is released, that anode will extinguish anode $16_d$, which is less positive and it will assume its load; the potential which anodes $6_b$ and $16_c$ have in common, follows the curves $bc$ starting from the point $c_4$. If at the time $t_8$, the anode $6_e$ is liberated, it starts and assumes the load of anode $6_b$ which becomes less positive. The current flow is then insured by the two anodes $16_c$ and $6_e$ whose common voltage with respect to point 13 is represented by the curve $ce$.

The diagram of the rectified voltage is then represented by the rippled curve $$D_3C_5C_4E_3D_5D_4F_3E_5E_4A_3.$$

If the leakages of transformer 3 were zero, the commutations would be instantaneous; times such as $t_7$ and $t_8$ for instance, could be very close to each other and times such as $C_5$ and $E_3$ would practically coincide. The phase displacement factor would still be equal to unity in the case of a rectified voltage equal to one-half the maximum voltage.

As in the preceding case, it will be advantageous to change, at sufficiently short intervals, the groups of active and inactive anodes, in order to preserve a good utilization of the rectifier of the transformer.

If one wishes to obtain an intermediate voltage between the maximum voltage with a value $E_m$ and a voltage with a value $$E_m \frac{\sqrt{3}}{2}$$

it may suffice to retard as already known, the moments of simultaneous ignition of the anodes $6_a$ and $16_a$, $6_b$ and $16_b$ . . . ; the diagram of the rectified voltage is then represented by the rippled curve $A_6A_7BB_6B_7CC_6C_7D$. The rectified voltage and the phase displacement factor vary then as the cosine of the angle of lag at the starting.

Figure 3:
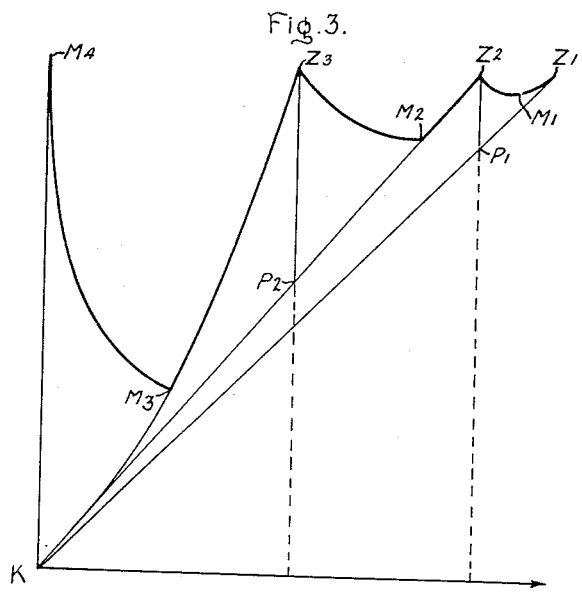

In Fig. 3, the straight line $KZ_1$ represents the variation of the theoretical phase displacement factor as a function of the ratio between the service voltage and the maximum voltage $E_m$, that ratio being plotted as abscissas.

Likewise, one can obtain voltages below the value $$E_m \frac{\sqrt{3}}{2}$$

by retarding the starting of the anodes in the second modus operandi that has been described. The diagram of the rectified voltage is then represented by the rippled curve $$A_9B_1B_8B_9C_1C_8C_9D_1D_8D_9E_1.$$

In Fig. 3, the straight line $KZ_2$ represents, for that operation, the variation of the phase displacement factor as a function of the rectified voltage.

The same principle of regulation by retarding the ignition of the arc cannot be applied in order to lower the service voltage corresponding to the third modus operandi which has been described. It will be noted that, in order that the diagram of the rectified voltage may pass from curve $bd$ to curve $ce$, it is necessary that the commutation between the anodes $16_c$ and $16_d$ take place prior to the time $t_8$. Beyond the time $t_8$, the voltage of the anode $16_c$ drops below that of the anode $16_d$, and the transfer of the load from anode $16_d$ to anode $16_c$ is no longer possible.

In the following it will be explained how it is possible to adjust the rectified voltage for values which are less than one-half the maximum voltage. In the method of regulation which has just been described, the theoretical phase displacement factor is represented as a function of the rectified voltage (Fig. 3), by the rippled line $Z_1P_1Z_2P_2Z_3$. It will be seen that it is always equal to or that it exceeds the phase displacement factor represented by the straight line $KZ_1$, which will be obtained by regulating the voltage by simply retarding the starting of the anodes.

A substantial amelioration of the phase displacement factor can be obtained by alternating, as was mentioned above, the operation of the converter according to two phase relations. If it is desired that the ripple of the rectified voltage become a minimum, the two operations must be alternated according to the commutation cadence of the anodes. If it is assumed, for instance, that at the time $t_9$, the anodes $6_e$ and $16_e$ supply energy up to the time $t_{10}$, the diagram of the rectified voltage is represented in Fig. 2 by the arc $E_{10}F$. At the moment $t_{10}$, only the anode $6_f$, for instance, is released, anode $16_f$ being blocked by its control grid. The anode $6_f$ assumes the load of anode $6_e$, and the two anodes $16_e$ and $6_f$ supply energy simultaneously, the diagram of the rectified voltage follows the curve $ef$. If at the time $t_{11}$ the anode $16_f$ is released, it starts and extinguishes the anode $16_e$, with the result that the diagram of the rectified voltage follows the curve $f$. It will be seen that it is possible to obtain a voltage diagram such as is represented by the rippled curve $E_{10}FF_{11}F_{10}GA_{11}A_{10}$. When the time intervals such as $t_{10}$—$t_{11}$ increase, while they remain at the same time below one-twelfth of a cycle ($t_{10}$—$t_{12}$), the rectified voltage and the phase displacement factor drop simultaneously. However, the phase displacement factor decreases less rapidly than the rectified voltage. In Fig. 3 the curve $Z_1M_1$ shows the variation of the theoretical phase displacement factor as a function of the rectified voltage. When the moment $t_{11}$ coincides with the moment $t_{12}$, the rectified voltage is equal to $$E_m \frac{2+\sqrt{3}}{4}$$

and the theoretical phase displacement factor passes through a minimum the value of which is close to 0.965.

Values of rectified voltages between $$E_m \frac{2+\sqrt{3}}{4}$$

and $$E_m \frac{\sqrt{3}}{2}$$

can be obtained by having the converter operate according to the rectified-voltage diagram $EF_1E_{12}E_{13}FG_1F_{12}F_{13}G$.

To this end the simultaneous output of the anodes $16_e$ and $6_f$ for instance, must be maintained up to the time $t_{12}$ (curve $ef$). At the time $t_{12}$, the anode $16_a$ is released and assumes the load of anode $16_e$ (curve $fa$). At the moment $t_{13}$, the anode $16_f$ is released and assumes the load of anode $16_a$ which becomes extinguished (curve $f$) the same phenomenon taking place at each sixth of a cycle.

When the time interval $t_{12}$—$t_{13}$ increases, the rectified voltage drops and the phase-displacement factor improves. At the limit, when the time interval $t_{12}$—$t_{13}$ is equal to one-twelfth of a cycle, the second modus operandi which has been studied is encountered, the rectified voltage is equal to $$E_m \frac{\sqrt{3}}{2}$$

and the phase-displacement factor is equal to unity. In Fig. 3, the segment $M_1Z_2$ shows the variation of the theoretical phase displacement factor.

For voltages that are slightly below $$E_m \frac{\sqrt{3}}{2}$$

it is necessary to lower the voltage by retarding the ignition of the arc (diagram $A_9B_1B_8B_9C_1C_8$ . . .); for the voltages between the value $$E_m \frac{\sqrt{3}}{2} \text{ and } E_m \frac{\sqrt{3}}{2} \times \frac{\sqrt{3}}{2} = E_m \frac{3}{4}$$

the retarding of the ignition instant amounts to thirty electric degrees. The phase displacement factor is represented in Fig. 3 by the straight-line segment $Z_2M_2$. The lower voltages between the values of rectified voltage that are respectively equal to $$\frac{3}{4}E_m \text{ and } \frac{1}{2}E_m$$

can be obtained with a better phase-displacement factor. In the preceding it has been explained that in order to obtain the change-over from the simultaneous output of anodes $6_b$ and $16_d$ (curve $bd$) to the simultaneous output of the anodes $16_c$ and $6_e$ (curve $ce$), it is necessary to go through the simultaneous output of anodes $6_b$ and $16_c$ (curve $bc$). A voltage value comprised between the values $$\frac{3}{4}E_m \text{ and } \frac{1}{2}E_m$$

can be obtained by changing over from the output of anodes $6_b$ and $16_d$ to the output of anodes $6_b$ and $16_c$, no longer at the time $t_7$ which is as close as possible to the time $t_8$, but at a time $t_{14}$ which lies considerably ahead. In this manner one can obtain the diagram of the rectified voltage $D_3C_{14}C_{15}E_3D_{14}D_{15}F_3$. In Fig. 3 the segment $M_2Z_3$ shows the variation of the theoretical phase-displacement factor as a function of the rectified voltage, the phase displacement factor returning gradually from the minimum value of $$\frac{\sqrt{3}}{2}$$

for the rectified voltage $$\frac{3}{4}E_m$$

to unity for the voltage $$\frac{1}{2}E_m.$$

Having brought about at the moment $t_{15}$, the commutation between the anodes $16_a$ and $16_f$, it suffices to prevent the starting of anode $6_b$ at the time $t_{16}$. The voltage diagram follows then the curve $ef$ to the point $B_{16}$, corresponding to the time $t_{17}$ where the starting of the anode $6_b$ alone is permitted. The voltage diagram follows then the rippled curve $F_5F_4B_3B_{16}B_{17}A_5A_4C_3C_{16}C_{17}$. The phase-displacement factor and the rectified voltage decrease simultaneously. In Fig. 3, the curve $KM_3Z_3$ shows the trend of the variation of the phase-displacement factor.

There still exists a fourth possible phase relation which corresponds to a theoretical phase-displacement factor equal to unity and to a rectified voltage which is theoretically zero. To this end, it would suffice to have two anodes supply energy permanently, to which voltages are applied which are in phase opposition, for instance the anodes $6_c$ and $16_f$ (the consumption in reactive power would be then zero). It will be easily seen that it is possible to obtain also voltages that are not equal to zero.

With anodes $6_c$ and $16_f$ supplying power simultaneously, and the instantaneous rectified electromotive force being zero, one can, at the time $t_{18}$, for instance, release anode $16_d$ which assumes the load of anode $16_f$. The rectified-voltage curve will then assume the shape of the arc $D_{18}A_{19}$ of curve $cd$. At the moment $t_{19}$ (whose representative point on the time axis coincides with the point $A_{19}$, whose ordinate is zero), the anode $6_a$ is released, and inasmuch as the voltage which is applied to it becomes equal at that moment to that of anode $6_c$, anode $6_a$ starts and causes anode $6_c$ to become extinguished. Anodes $6_a$ and $6_d$ to which voltages are applied in phase opposition, deliver their energy simultaneously, and the instantaneous rectified voltage is zero. One can thus represent the rectified voltage by means of a broken line $C_{20}C_{18}F_{19}D_{20}D_{18}A_{19}E_{19}E_{18}$ . . . the point $D_{20}$, the ordinate of which is zero, coinciding on the time axis with the representative point of time $t_{18}$. As in the preceding cases, the changes will be made so that all the anodes will be equally loaded.

In Fig. 3, the curve $M_4M_3$ shows the trend of the variation of the phase-displacement factor.

For the rectified voltages that are comprised between zero and the maximum voltage $E_m$, the theoretical phase-displacement factor is represented by the rippled curve $M_4M_3Z_3M_2Z_2M_1Z_1$. With the method of regulation consisting simply in varying the instant of starting the anodes, the phase displacement factor will be represented by the straight line $KZ_1$. It will be seen that the application of the invention makes it possible to considerably decrease the reactive power consumption.

If a slight increase in the rippling factor of the voltage is permissible, the phase displacement factor may be still further increased. For instance, the rectified voltage having a value $$\frac{2+\sqrt{3}}{4}E_m$$

may be obtained, with a phase-displacement factor equal to unity, by having the operation proceed according to the rectified-voltage diagram represented by $AA_7BC_1CC_7DE_1EE_{10}$. The explanations which have been just given make it possible to predict, at every instant, which the anodes are that must be prevented from starting. Likewise, the voltages between the values $$\frac{\sqrt{3}}{2}E_m \text{ and } \frac{1}{2}E_m$$

may be obtained with a phase displacement factor equal to unity by having the operation follow the rectified-voltage diagrams similar to that represented by the rippled curve $D_3DF_3A_3GC_3$.

The foregoing descriptions relate to the operation as a rectifier, but it is quite evident that the converter shown in Fig. 1 could also operate as an inverter. The rippled curve MNOPQRSTUVXYZ of Fig. 2 represents the operating diagram corresponding to a continuous supply voltage comprised between the values $E_m$ and $$\frac{2+\sqrt{3}}{4}E_m$$

The foregoing explanation regarding the rectifier operation will enable any person acquainted with the art to understand the inverter operation.

In Fig. 1a there is disclosed a portion of the grid control circuit by means of which the control grids of a 12-anode tank rectifier may be controlled in accordance with the modes of operation described above. While for purposes of clarity only a portion of the grid control circuit is shown as applied to the circuit arrangement disclosed in Fig. 1, it will be apparent to those skilled in the art that similar grid control circuits may be applied to the 12-anode rectifier arrangements disclosed in the other figures of this application.

A suitable phase shifting device 20 energized from the alternating current line 1 is arranged to be connected by means of either of the switches 21, 22, to the primary windings of the transformers 23, 24 and 25. These transformers which are preferably of the type which produce peaked impulses in the secondary windings thereof are provided with primary windings having their midpoints connected together through the three phase inductor 26. The secondary windings of these transformers 23, 24 and 25 are arranged to be connected by means of switches 27, 28 and 29 to the primary windings of the transformers 30, 31 and 32. In order to prevent excessive current from flowing through the transformer windings, current limiting resistors 33, 34 and 35 are connected respectively between the windings of the transformers 23, 24 and 25 and the windings of the transformers 30, 31 and 32. The primary windings of the transformers 30, 31 and 32 may also be provided with shunt circuits including rectifiers 36, 37 and 38 which may be of the dry contact or copper oxide type for the purpose of preventing the negative peak from being transferred to the secondary windings of the transformers 30, 31 and 32. The secondary windings of the transformers 30, 31 and 32 are connected, respectively, to the grids of the anodes 6a, 6c and 6e. The grid circuits of these anodes are completed by means of suitable slip rings through the alternating current generator 39 and the direct current generator 40 to the cathode 11 of the tank rectifier 10. The alternating current generator 39 is excited by means of a direct current field 41, which may be energized from the direct current circuit 42 by means of a switch 43. The direct current generator 40 is excited by means of the field 44 which is connected to the direct current circuit 42 by means of the switch 45. Both the direct current generator 40 and the alternating current generator 39 are driven by means of a synchronous alternating current motor 46 which may be energized from any suitable source of alternating current such as the alternating current line 1.

By means of a similar arrangement of circuit elements controlled by the switches 47 to 52 these circuit elements shown to the right in Fig. 1a operate to control the grids for the anodes 16b, 16d and 16f. Similar sets of apparatus are provided for each of the groups of grids for the anodes 6b, 6d, 6f, and 16a, 16c, 16e.

For full load operation the phase shifters 20, 54 and those of the other two groups of control grids are set so as to permit each anode to start as soon as its potential becomes equal to or exceeds that of the anodes which supplied energy just previously. For this operation, the switches in all the apparatus corresponding to switches 21 to 47, 27 to 29 and 49 to 51 are in the closed position.

For operation where the maximum rectified voltage $$E_m = \frac{\sqrt{3}}{2}$$

and the theoretical phase displacement factor is still equal to unity the starting of the anodes 6b, 6d, 6f and 16a, 16c, 16e is prevented. This is accomplished by opening the switches 27 to 29 and 49 to 51 and then opening the switches 21 and 47 to remove the positive voltage peaks applied by the grid circuit transformers. In order to prevent these grids from starting a negative bias is applied to the grids by closing the switches 45 and 53 which control the energization of the field coils of the direct current generators of the respective grid circuits.

For operation which will produce a rectified voltage equal to one-half the maximum voltage and a phase displacement factor equal to unity, only two anodes supply energy at any time. The voltages applied to these anodes are 120 electrical degrees out of phase. For this operation all of the grid circuits are provided with a negative biasing voltage obtained by closing the switches to the field coils of the various direct current generators. The grids of the groups of anodes 6a, 6c and 6e are energized so that the anodes become conductive 30 electrical degrees earlier than they would under full load condition. This is accomplished by closing switches 27, 28 and 29 and also 21 and adjusting the phase shifter 20 so as to advance the phase to the proper point. The grids of the anodes 16b, 16d, 16f are also energized with a phase relation similar to the grids of the anodes of the groups 6a, 6c and 6e. The remaining groups of anodes, however, are energized so as to become conductive 30 electrical degrees later than they normally would under full load and this is accomplished by closing the switches corresponding to switches 27, 28, 29, 49, 50 and 51 and the switches 22 and 48 and adjusting the phase shifters 20 and 54 so as to cause the anodes 6b, 6d, 6f and 16a, 16c, 16e to become conductive during the latter third of the positive half cycle of anode voltage.

If, for instance, during half load operation after having the anodes 6a, 6c, 6e, 16b, 16d, 16f conduct it is desired to change to the anodes 6b, 6d, 6f, 16a, 16c, 16e, it is possible to make this commutation automatically by means of a synchronous switch operated by the synchronous motor 46. This switch mechanism may be arranged to energize relays which are positioned so as to operate in proper sequence the switches corresponding to switches 21, 27, 28, 29 and 45. Inasmuch as such an arrangement is believed to be quite apparent to those skilled in the art, it has not been disclosed in Fig. 1a.

Figure 5:
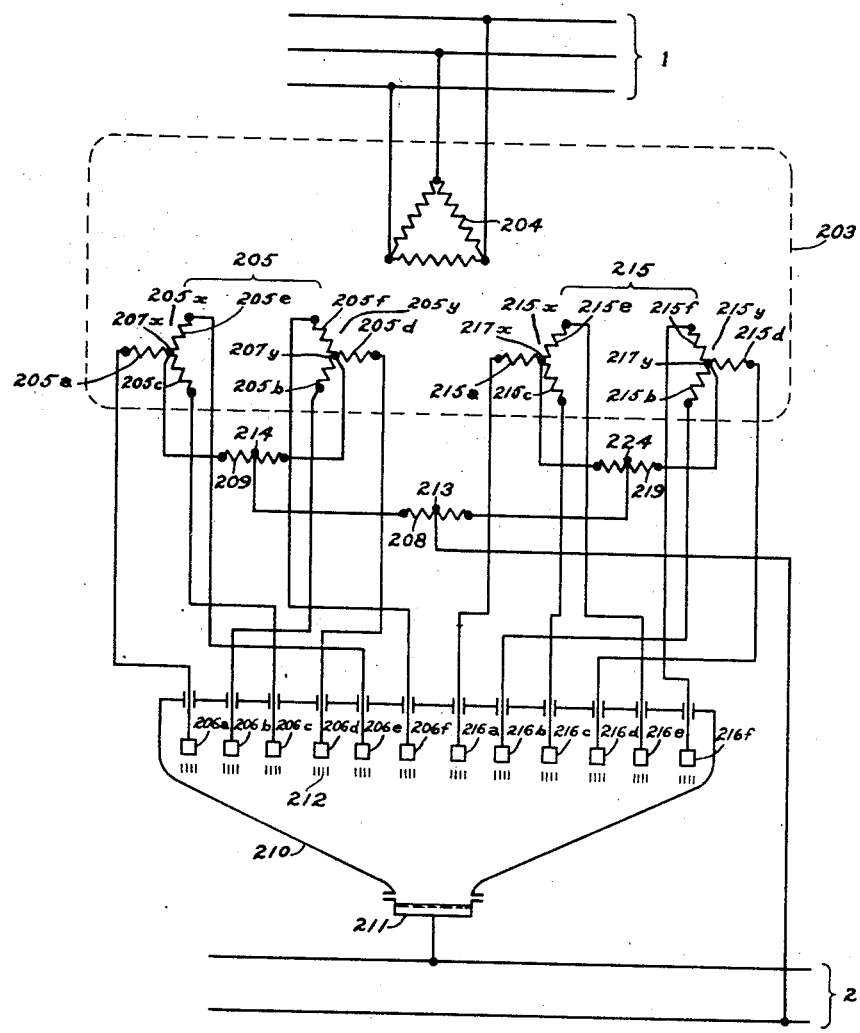
Figure 6:
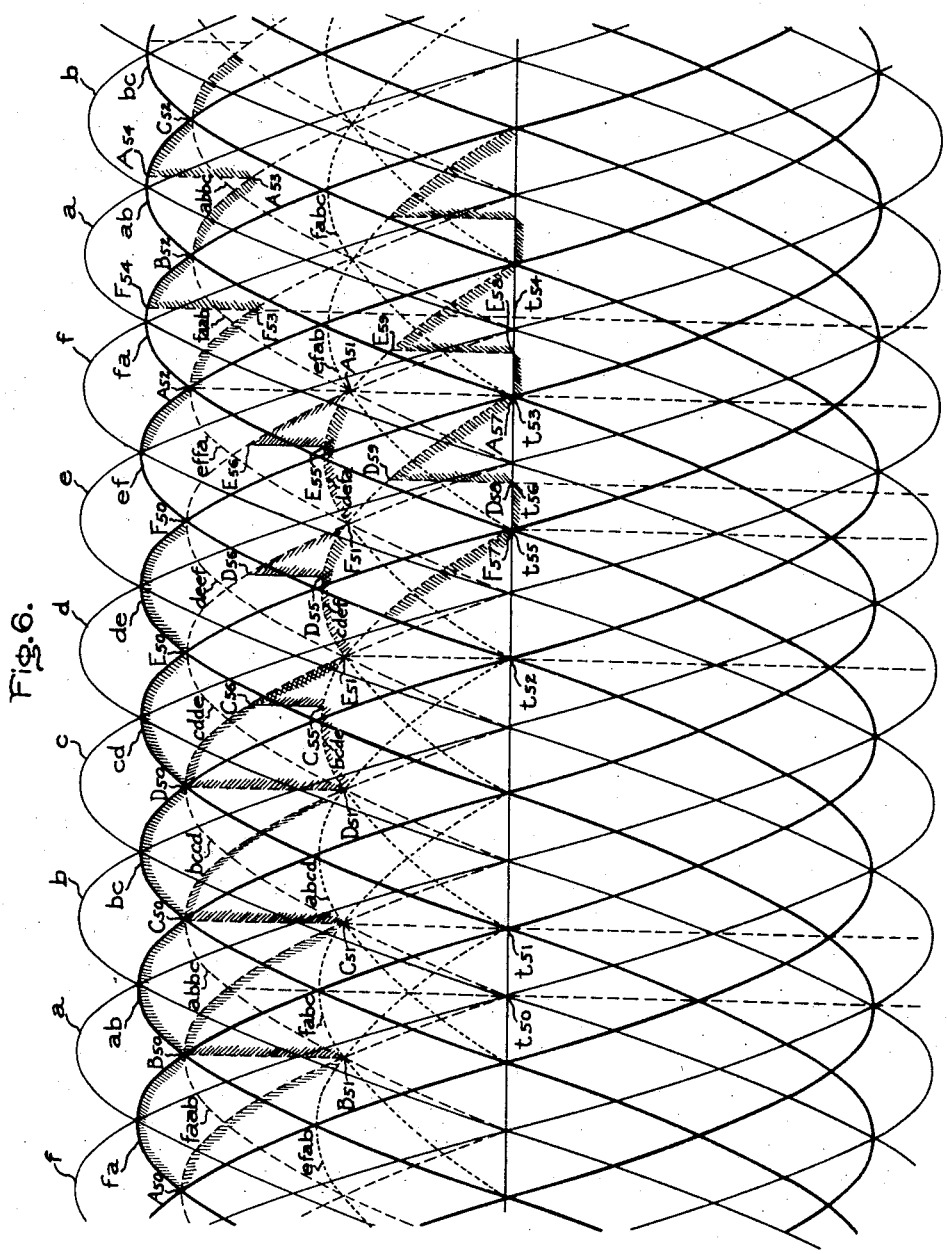

If it is desired to apply the grid control circuit disclosed in Fig. 1a to the rectifier arrangement disclosed in Fig. 5, it will be found from an inspection of the curves in Fig. 6 that at half load operation a certain sequence of excitation is necessary. Thus for instance, during one period the anodes $206_b$, $216_c$, $106_d$, $206_e$ are conductive then the anodes $216_c$, $216_d$, $206_e$, $206_f$ and later $216_d$, $206_e$, $206_f$, $216_a$, etc. From this it will be apparent that anode $206_b$, for instance, will not become conductive again until the next 720 electrical degree period. In order to obtain the proper grid excitation for this type of operation the following is the sequence of the switches operated in order to provide grid voltage: Switches 27, 28, 29 are closed then switch 21 and switches 45 and 43. Switch 43 energizes the alternating current generator 29 which preferably is of the type which produces rectangular wave shape of a frequency one-half that of the alternating current frequency of the line 1. This introduction of an alternating current of one-half the frequency of line 1 and of substantially rectangular shape will so bias the grids of the rectifier during alternate cycles of the main line frequency so that, for instance, anode $206_a$ becomes conductive only once every 720 electrical degrees.

Figure 4:
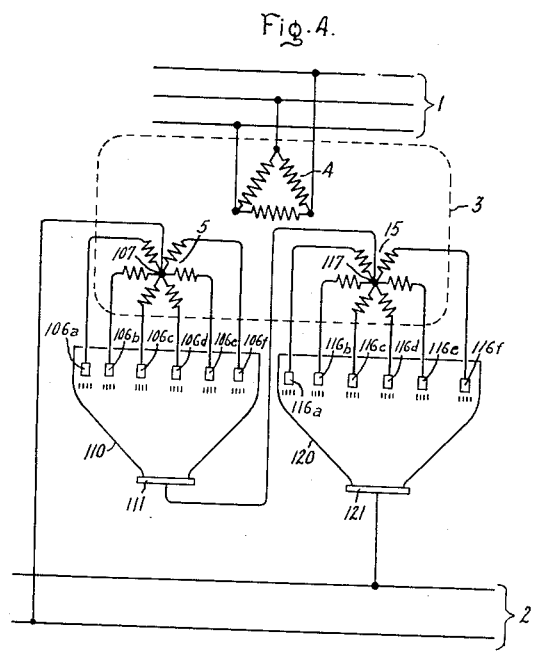

Fig. 4 represents another physical embodiment of the invention where the elementary groups are connected in series. The secondaries 5 and 15 of the transformer 3 supply, respectively, the anodes $106_a$—$106_b$—$106_c$—$106_d$—$106_e$—$106_f$ and $116_a$—$116_b$—$116_c$—$116_d$—$116_e$—$116_f$ of two mercury vapor rectifiers, 110 and 120. The secondary 5 and the rectifier 110 comprises one elementary group, while the secondary 15 and the rectifier 120 comprises another elementary group. The two groups are connected in series so that the neutral point 117 of the secondary 15 is connected to the cathode 111 of rectifier 110 and the neutral point 107 of the secondary 5 and the cathode 121 of the rectifier 120 are connected respectively to opposite sides of the line 2.

All the explanations which were given regarding the operation of the circuit represented in Fig. 1 apply to the operation of the circuit represented in Fig. 4, taking account of the fact that the instantaneous rectified voltage at the outer terminals of the converter is equal to the sum of both voltages that are induced in the phase windings connected to the two anodes which supply energy simultaneously, instead of being equal to their mean value. Likewise, the diagrams of Fig. 2 serve also to explain the operation of the circuit shown in Fig. 4 by assuming that the curves $a$—$b$—$c$—$d$—$e$—$f$ represent no longer the common voltages that are induced, respectively, in the phase windings ($5_a$, $15_a$) ($5_b$, $15_b$) ($5_c$, $15_c$) ($5_d$, $15_d$) ($5_e$, $15_e$) ($5_f$, $15_f$), but twice these common voltages. The curves of Fig. 3 represent likewise the trend of the variation of the theoretical phase displacement factor as a function of the value of the rectified voltage.

Fig. 5 represents another application of the invention to a twelve-anode rectifier, this example being particularly adapted to the generation of high-density currents in so far as the load current is equally distributed between four anodes which supply energy simultaneously.

In Fig. 5, the primary 204 of transformer 203 is connected to the network 1. The two six-phase secondaries 205 and 215 are resolved, respectively, in two three-phase stars $205_x$ and $205_y$ on the one hand, and $215_x$ and $215_y$ on the other hand. The neutral points $207_x$ and $207_y$ of the star connections $205_x$ and $205_y$ are interconnected by means of an interphase coil 209. Likewise, the neutral points $217_x$ and $217_y$ of the stars $215_x$ and $215_y$ are interconnected by means of the interphase coil 219. The mid-points 214 and 224 of the coils 209 and 219 are interconnected by a third interphase coil 208, the midpoint 213 of which is connected to one side of the line 2, the other side thereof being connected to the cathode 211 of the twelve-anode rectifier 210.

The phase windings $205_a$, $205_b$, $205_c$, $205_d$, $205_e$, $205_f$ on the one hand and $215_a$, $215_b$, $215_c$, $215_d$, $215_e$, $215_f$ on the other hand which are enumerated in the order corresponding to the sense of direction of the phases, are connected, respectively, to the anodes $206_a$, $206_b$, $206_c$, $206_d$, $206_e$, $206_f$ and $216_a$, $216_b$, $216_c$, $216_d$, $216_e$, $216_f$. As in the preceding case, the connections of the control grid such as 212 have not been represented.

The converter which is illustrated in Fig. 5 is resolved into four elementary groups which function in parallel and which are each constituted by the windings of one of the three-phase stars and the corresponding anodes, for instance by the star $205_x$ and the anodes $206_a$, $206_c$, and $206_e$. As in the preceding explanations, it will be assumed that the transformer 203 has no leakage inductances and that the commutation between the anodes is instantaneous.

It will be easily seen that at every instant, four anodes, each corresponding to an elementary group, supply energy simultaneously and that there is still a possibility of four additional phase relations.

In Fig. 6, the curves $a$ to $f$ represent the electromotive forces that are induced in the windings $205_a$ or $215_a$,—$205_f$ or $215_f$, which will be assumed to be identical to the windings $5_a$ or $15_a$,—$5_f$ or $15_f$.

The first phase relation will be obtained by having the anodes supply energy naturally. The operation then is identical to that of two six-phase rectifiers which are provided with interphase coils that operate in parallel, the anodes $206_a$ and $216_a$, for instance, supplying energy at the same time as the anodes $206_b$ and $216_b$ and becoming extinguished when the anodes $206_c$ and $216_c$ start.

In Fig. 6, the curves $fa$, $ab$,—and $ef$ represent, as in the preceding explanations, the resultant voltage curves corresponding to the first phase relation. The diagram of the maximum rectified voltage is represented by the rippled curve $A_{50}$—$B_{50}$—$C_{50}$—$D_{50}$—$E_{50}$—$F_{50}$; the theoretical phase displacement factor being equal to unity.

The second phase relation will be obtained by having only the anodes $206_f$—$206_a$—$216_a$—$216_b$, and then the anodes $216_a$—$216_b$—$206_b$—$206_c$—etc. for instance, supply energy simultaneously. In Fig. 6, the curves $faab$, $abbc$, ..., $effa$, represent the resultant voltage curves corresponding to the second phase relation. It will be easily seen that this second relation cannot correspond to an operation with a unity phase displacement factor. For instance, the changeover from the simultaneous output of anodes $206_f$—$206_a$—$216_a$—$216_b$, to the simultaneous output of the anodes $216_a$—$216_b$—$206_b$—$206_c$, cannot take place at the time $t_{50}$ corresponding to the point of intersection of curves $faab$ and $abbc$, because the current supplied by the anode $206_a$ could not be transferred to the anode $206_c$ as long as the voltage which is induced in the winding $205_c$ is not at least equal to the voltage which is induced in the winding $205_a$, that is to say, prior to the time $t_{51}$ corresponding to the point of intersection of curves $a$ and $c$. The result is that the second phase relation does not permit obtaining a rectified voltage which exceeds that represented in Fig. 6 by the diagram $A_{50}$—$B_{51}$—$B_{50}$—$C_{51}$—$C_{50}$—$D_{51}$—$D_{50}$—$E_{51}$. It will be easily seen that the value of the rectified voltage obtained in this manner is equal to at least three quarters of the maximum voltage (not considering the voltage drop) and that the theoretical phase displacement factor is equal to $$\frac{\sqrt{3}}{2}$$

that is to say, noticeably higher than 0.75, the value of which would be necessary if the decrease in voltage were obtained only by a simple retarding at the starting of the anodes.

A third phase relation will be obtained by having only four anodes supply energy simultaneously, which are fed, respectively, by four windings that apply consecutive phase voltages, for instance, the anodes $206_b$—$216_c$—$216_d$—$206_e$, and then the anodes $216_c$—$216_d$—$206_e$—$206_f$. In Fig. 6 the curves $efab$, $fabc$, $abcd$, etc., represent resultant voltages corresponding to the third phase relation.

This third phase relation permits the operation with a theoretical phase-displacement factor equal to unity. It will be seen that the change-over from the simultaneous output of anodes $206_b$—$216_c$—$216_d$—$206_e$ (for instance) to the simultaneous output of anodes $216_c$—$216_d$—$206_e$—$206_f$, necessitates the commutation of the current from the anode $206_b$ to the anode $206_f$. This is possible at the time $t_{52}$, corresponding to the point $E_{51}$ where the curves $bcde$ and $cdef$, intersect, for the potential of the anode $206_f$ then becomes equal to and finally exceeds the voltage of anode $206_b$. The rectified-voltage diagram is then represented by the rippled line $B_{51}$—$C_{51}$—$D_{51}$—$E_{51}$. It will be seen that the rectified voltage then is equal to one half of the maximum rectified voltage.

The fourth possible phase relation corresponds to the simultaneous output of four anodes, two by two in phase opposition, that is to say at a rectified voltage equal to zero. With the first three phase relations, the functioning of the various anodes was such that they were equally loaded. With the fourth, only four anodes would be under load, and it is advantageous to establish the changes between the active and the inactive anodes. As in the case of the first example which has been described, the intermediate rectified voltage can be obtained by alternating the operation of the converter according to several phase relations. If, for instance, the anodes $206_e$—$216_e$—$206_f$—$216_f$ supply energy simultaneously, and at the time $t_{53}$ the starting of anode $206_a$ alone is permitted, the rectified-voltage diagram will follow the curve $effa$ to the time $t_{54}$, where the starting of the anode $206_f$ will be permitted, and so forth. It will be thus possible to obtain the rectified-voltage diagram which is given by the line $A_{52}$—$F_{53}$—$F_{54}$—$B_{52}$—$A_{53}$—$A_{54}$—$C_{52}$ . . . , which corresponds to a rectified voltage the value of which is between the maximum value and three quarters of the maximum value. Likewise, the explanations which have been already given make it possible to understand that a voltage diagram such as the one represented by the rippled curve $D_{51}$—$C_{55}$—$C_{56}$—$E_{51}$—$D_{55}$—$D_{56}$—$F_{51}$—$E_{55}$—$E_{56}$—$A_{51}$ . . . can be obtained and permits obtaining values of rectified voltages that lie between three quarters and one half of the maximum value.

Contrary to what occurred in the first example, voltages less than one half the rectified voltage can be obtained by retarding the change-over from the output of a series of anodes to the output of the following series. For instance, the change-over from the simultaneous output of anodes $206_b$—$216_c$—$216_d$—$206_e$, to the simultaneous output of anodes $216_c$—$216_d$—$206_e$—$206_f$, requires simply that the current changes over from anode $206_b$ to anode $206_f$. This commutation is possible, starting from the time $t_{52}$ and may be retarded by any electrical degree which is at most equal to 180 degrees; since anode $206_f$ is more positive than anode $206_b$ in the corresponding time interval, the commutation will be possible at the desired instant.

This method of regulation involving a time lag at the commutation, is the only one which can be used to obtain the rectified-voltage values comprised between one-half and one-fourth of the maximum voltage.

Voltages less than one-fourth of the maximum voltage can be obtained either by increasing the time lag at the commutation or by causing the two operations to alternate according to the phase relations corresponding to one-half of the rectified voltage and to zero rectified voltage. For instance, if the anodes $206_b$—$216_c$—$216_d$—$206_e$ (curve $bcde$) have a simultaneous output, and if at the time $t_{55}$, the anode $216_f$ is released, the latter anode will extinguish the anode $216_d$, and the four anodes $206_b$, $216_c$, $206_e$, $216_f$ will have a simultaneous output which will give a resultant voltage equal to zero. At the time $t_{56}$, the anode $206_d$ is released, it extinguishes anode $206_b$, and the anodes $216_c$, $206_d$, $216_e$, $216_f$ will have a simultaneous output (representative curve $cdef$). After that one will change over to the simultaneous operation of anodes $216_c$, $206_d$, $216_f$, $206_a$, then $206_d$, $216_e$, $216_f$, $206_a$, and so forth, and obtain thus voltage diagrams such as the one represented by the line $F_{57}$—$D_{58}$—$D_{59}$—$A_{57}$—$E_{58}$—$E_{59}$ . . . , the points $F_{57}$, $D_{58}$ and $A_{57}$ whose ordinate is zero coinciding on the abscissa axis with the representative points of the times $t_{55}$, $t_{56}$ and $t_{53}$.

Figure 7:
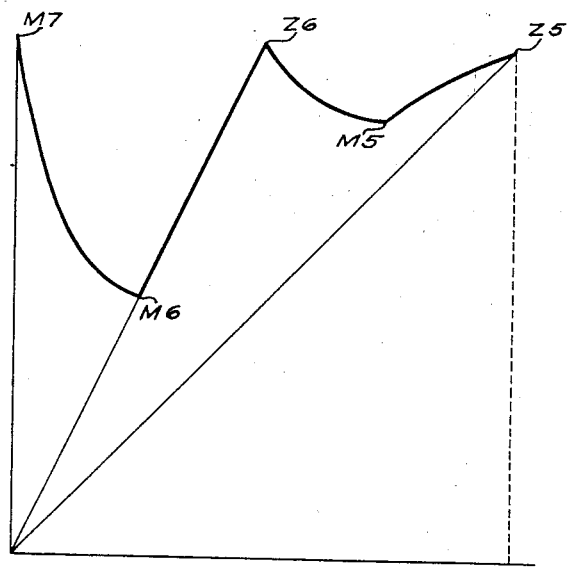

In Fig. 7, the line $M_7$ $M_6$ $Z_6$ $M_5$ $Z_5$ shows the trend of the variation of the theoretical phase displacement factor corresponding to the circuit represented in Fig. 5, as a function of the ratio between the rectified voltage and the maximum rectified voltage $E_m$.

It will be easy to follow the operation of this circuit as an inverter circuit, and it will be found that the representative curves of the theoretical phase displacement factor are still the same as those represented in Fig. 7.

The same results could be obtained by arranging the four elementary groups, which constitute the converter represented in Fig. 5, in series or in series parallel.

As in the preceding explanations the intermediate voltages can be also obtained and the phase displacement factor improved by alternating the operations according to two different phase relations, at a frequency which is below the natural commutation frequency of the anodes.

Figure 8:
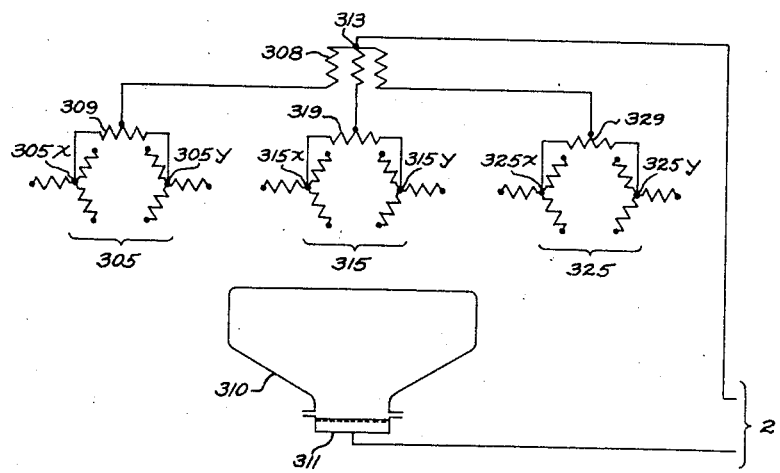

Fig. 8 represents schematically one of the physical embodiments of the invention comprising an eighteen-anode rectifier. The supply transformer (the primary windings of which are not represented) comprises three secondary six-phase windings 305, 315 and 325, which are resolved respectively, in the three-phase stars, $305_x$ and $305_y$, $315_x$ and $315_y$, $325_x$ and $325_y$, the neutral points of the two three-phase stars comprising one of the secondaries, being interconnected by means of the single-phase coils 309, 319, and 329. The mid-points of these coils are interconnected by a three-phase coil 308, the neutral point 313 of which is connected to the negative pole of the network 2. The phase windings supply, respectively, the eighteen anodes (not shown) of the rectifier 310, the cathode 311 of which is connected to the positive side of the line 2. It will be noted that six anodes have a simultaneous output and the operation with a unity phase-displacement factor is possible for the rectified voltages that are equal to the maximum voltage in the case of two thirds of the maximum voltage and of a zero rectified voltage. Other phase combinations are possible, which correspond to a theoretical phase displacement factor which is slightly less than unity. Particularly, one can verify that, for rectified voltage values between the maximum value and its two thirds, the theoretical phase displacement factor never goes below six hundredths of unity.

The examples of application which have been just described correspond to circuits for which the various possible phase combinations correspond to the simultaneous output of the same number of anodes and for which the process which is the object of the invention is combined with the regulating process consisting in retarding asymmetrically the moments of ignition of the various anodes of the apparatus in question. The invention is in nowise limited to this particular embodiment. It is an easy matter to work out circuits by using the method constituting the object of the invention, in which the number of anodes that have a simultaneous output is not necessarily the same for all phase relations, and which do not require the asymmetrical loading of the anodes during one cycle for all the values of the continuous potential that differ from the maximum voltage.

Fig. 9 represents schematically a circuit in which two phase combinations correspond to the simultaneous output of two anodes and in which all the anodes have a simultaneous output during one cycle, a third combination of phases corresponding to the simultaneous output of three anodes.

The supply transformer (the primary windings of which are not shown) comprises two identical six-phase secondaries 405 and 415, each one of which is resolved into three groups $405_x$, $405_y$, $405_z$ and $415_x$, $415_y$, $415_z$, each constituted by two windings in phase opposition. The secondary windings $405_a$, ..., $405_f$ and $415_a$ ... $415_f$ (which are enumerated in the order of the phase rotation) are connected, respectively, to the twelve anodes $406_a$, ... $406_f$ and $416_a$ ... $416_f$, of a mercury vapor rectifier 410, which is provided with control grids (not shown) and the cathode 411 of which is connected to one side of the line 2.

The mid-points of the winding groups $405_x$ and $415_y$, $405_y$ and $415_z$, $405_z$ and $415_x$, are interconnected, respectively, two by two, by means of windings $408_{xy}$, $408_{yz}$ and $408_{zx}$, which are arranged, respectively, on the three legs of a three-phase magnetic circuit comprising an interphase transformer or current divider 400. The mid-points of the three windings $408_{xy}$, $408_{yz}$ and $408_{zy}$ are interconnected and are combined at the second pole of network 2.

If all the control grids permit the ignition of the anodes, two of the latter, for instance anodes $416_f$ and $406_a$, will be compelled to have a simultaneous output of equal currents, so that the direct-current ampere turns will be balanced in both halves of $408_{xy}$. When anode $416_a$ becomes more positive than anode $416_f$, it has the tendency to start, but its current is limited to the magnetized current of winding $408_{zx}$, and it can assume a considerable load only if one of the anodes corresponding to the winding group $405_z$ can start in its turn. Because of an inductance force in the winding $408_{zx}$, the potential difference between the anode $416_a$ and the cathode manifests itself at the center point of the winding group $405_z$ and raises the potential of anodes $406_b$ and $406_e$. When the potential of anode $406_b$ is thus increased and attains the potential of anodes $416_f$ and $406_a$ which are supplying energy, that anode will start in turn and will take the place of anode $406_a$, while at the same time anode $416_a$ will take the place of anode $416_f$, as a result of the electromotive forces that are induced in the interphase transformer 400. This commutation will be possible as soon as the sum of the voltages that are induced in the windings $415_a$ and $405_b$ is equal to the sum of the voltages induced in windings $405_f$ and $415_a$, that is to say when the voltages induced in windings $415_f$ and $405_b$ will be equal.

The operation which has been just described corresponds to the maximum rectified voltage. The effect of the control grids makes it possible to retard the commutation and to decrease the value of the rectified voltage.

A second phase relation can be obtained, which makes possible a phase displacement factor equal to unity, by having only two anodes supply energy simultaneously, which correspond, one to the secondary 405 and the other to the secondary 415, and which are fed by the windings the voltages of which are one-third of a cycle out of phase, for instance the anodes $406_a$ and $416_c$. With the foregoing explanations it is easy to see that if the anodes $406_b$ and $416_d$ are released, all the other anodes being blocked, they will assume the load and will extinguish the two anodes $406_a$ and $416_c$ when the sum of the voltages of the phase windings $405_b$ and $415_d$ will be equal to the sum of the voltages of windings $405_a$ and $415_c$. As in the preceding, the rectified voltage can be lowered by retarding their commutation.

The first two phase relations make it possible to obtain, with a theoretical phase displacement factor equal to unity, rectified voltages whose values are in the ratio of $$1 \text{ to } \frac{\sqrt{1}}{3}$$

It will be noted that for the two operations which have been just described, each anode supplies energy for one-sixth of a cycle during each cycle.

A third phase relation is obtained by allowing only the anodes corresponding to one of the two secondaries to supply energy, for instance, the anodes $406_a$, ..., $406_f$. The balance of the direct-current ampere turns on the interphase transformer 400, can only be obtained if three anodes each corresponding to one of the groups $405_x$, $405_y$ and $405_z$ have a simultaneous output. If the ignition between anodes is not retarded, the value of the rectified voltage is equal to the maximum voltage corresponding to the first combination of phases multiplied by $$\frac{4}{3\sqrt{3}}$$

and the theoretical displacement factor is equal to unity.

As in the cases that have been described in the preceding explanations, it is easy to bring about a permutation of the operations according to two phase relations, in order to obtain intermediate voltage values.

The invention is applicable to inverters or to static frequency changers. Fig. 10 shows a physical embodiment, in conformity with the invention, of an inverter which insures the transfer of energy from a three-phase network to a single-phase network of lower frequency. In Fig. 10, two converters 500 and 600, identical to the one represented in Fig. 1, are interconnected according to the well-known figure eight circuit. Cathode 511, for instance, being connected to the neutral point 613, of the interphase coil 603 of the other converter, and the single-phase network 502 being connected to the two cathodes 511 and 611 of both converters.

According to the well-known technique, each converter supplies a half-wave of the low-frequency voltage. The diagrams of Fig. 11 reproduce the curves $a \ldots f$, $ab \ldots fa$, $ac \ldots fb$, already represented in Fig. 2.

The explanations which have been given in connection with the circuit shown in Fig. 1 make it obvious that the successive combinations of the simultaneous output of the anodes connected to windings $505_a$, $515_c$, $505_d$ and $515_c$, $505_d$ and $515_e$, $505_e$ and $515_e$, $505_f$ and $515_e$, $505_f$ and $515_a$, $505_c$ and $515_a$ make it possible to obtain a voltage diagram $A_{100}$—$B_{100}$—$C_{100}$—$D_{100}$—$E_{100}$—$F_{100}$—$G_{100}$—$H_{100}$—$I_{100}$, which represent the half-wave furnished by the converter 500, of a single-phase voltage the frequency of which is equal to one-third of the supply frequency, the converter 600 supplying the second half wave in the same manner.

Similarly, one can obtain the voltage of the half frequency of which one-half wave is represented by the rippled curve $J_{100}$—$B_{100}$—$C_{100}$—$E_{100}$—$F_{100}$—$G_{100}$—$K_{100}$—$L_{100}$. Inasmuch as each converter 500 and 600 can likewise (as has been already explained in connection with Fig. 1) operate as an inverter, it is evident that the network 502 will be able to return energy into network 1 whenever necessary, and that consequently, according to a well-known practice, the converter represented in Fig. 10 will be able to supply an alternating current which is out of phase with respect to the network voltage 502, that is to say, will be able to supply or absorb reactive power.

The physical embodiments which have been just described may be considered as comprising a part of the invention, but they are not a limitation of the invention. Numerous variations may be easily conceived which will still remain within the scope of the invention, particularly that single anode valves may be used, since the secondary windings of the transformers can be polygon-connected as well as star-connected.

While I have shown the application of my invention to certain specific embodiments it will, of course, be understood that I do not wish to be limited thereto, since it is apparent that the principles herein described are susceptible of numerous other applications without departing from the spirit and scope of my invention as set forth in the appended claims.

What I claim as new and desire to secure by Letters Patent of the United States, is:

1. In an electric valve converting system including a plurality of groups of valves each provided with a polyphase winding, and an inductive winding interconnecting said polyphase windings, the method of operation which comprises maintaining certain of said valves in each group non-conductive to obtain a reduced power output, and at regular intervals alternating the function of said non-conductive valves with said conductive valves.

2. In an electric valve converting system having a plurality of polyphase windings interconnected by an inductive winding, and an electric valve having a plurality of controlled anodes connected to said polyphase windings, the method of reducing the output of said system which comprises rendering inactive certain anodes associated with each of said polyphase windings and retarding the moment of ignition of the remaining anodes thereby to improve the power factor of said system at said reduced power output.

3. In an electric valve converting system having a plurality of polyphase windings interconnected by an inductive winding, and a group of controlled electric valves for each of said polyphase windings, the method of reducing the power output thereof which comprises gradually retarding the time of ignition of said valves up to a certain point in the load characteristic of said system, then rendering inactive certain valves of each group and again gradually retarding the time of ignition of said valves thereby to improve the theoretical phase displacement factor for said operating range.

4. In an electric valve converting system having a plurality of polyphase windings interconnected by an inductive winding, and a group of controlled electric valves for each of said polyphase windings, the method of controlling the power output thereof which comprises rendering inactive certain valves in each group while permitting the remaining valves to become active for a certain time interval and during a subsequent time interval rendering inactive the valves which were active in the preceding interval while permitting said first mentioned certain valves to become active.

5. In an electric valve converting system including a plurality of polyphase windings interconnected by an inductive winding, and a group of controlled electric valves for each of said polyphase windings, the method of operation which comprises maintaining non-conductive certain valves of each group to obtain a certain reduced power output with a unity power factor and controlling said valves in the operating region between said certain reduced power output and full power output by permuting between the operating sequences of said valves at said different power outputs and simultaneously varying the time of ignition of said valves thereby to improve the power-factor load-characteristic of said system.

JEAN AUGIER.